United States Patent [19]

Lunsford

[11] Patent Number: 4,654,728
[45] Date of Patent: Mar. 31, 1987

[54] PORTABLE MESSAGE DEVICE WITH A HOOK SHAPED ATTACHING MEANS

[76] Inventor: Herbert W. Lunsford, 9515 Eve La., Santee, Calif. 92071

[21] Appl. No.: 808,248

[22] Filed: Dec. 12, 1985

Related U.S. Application Data

[63] Continuation-in-part of Ser. No. 493,030, May 9, 1983, abandoned.

[51] Int. Cl.[4] .................. G11B 15/48; G11B 33/02
[52] U.S. Cl. .................................. 360/74.1; 360/12; 369/19; 369/64; 369/76
[58] Field of Search ............... 360/12, 137, 74.1, 55, 360/72.1; 369/19, 20, 69, 75.1, 76, 63, 64; 434/319

[56] References Cited

U.S. PATENT DOCUMENTS

| | | | |
|---|---|---|---|
| 2,517,181 | 8/1950 | Davis | 369/69 |
| 2,561,602 | 7/1951 | Valentino et al. | 360/12 |
| 2,802,906 | 8/1957 | Goldenberg et al. | 369/69 |
| 3,405,944 | 10/1968 | Krechman | 369/69 |
| 3,509,288 | 4/1970 | Leventhal | 360/12 |
| 3,870,318 | 3/1975 | Poynter | 369/19 |
| 3,889,290 | 6/1975 | Seaton | 360/12 |
| 4,100,581 | 7/1978 | Slack et al. | 369/69 |
| 4,169,970 | 10/1979 | Opiela et al. | 360/12 |
| 4,541,805 | 9/1985 | Weaver et al. | 360/12 |

FOREIGN PATENT DOCUMENTS

| | | | |
|---|---|---|---|
| 2055083 | 5/1972 | Fed. Rep. of Germany | 360/12 |
| 875436 | 8/1961 | United Kingdom | 360/12 |
| 1152743 | 5/1969 | United Kingdom | 360/12 |

*Primary Examiner*—Raymond F. Cardillo
*Assistant Examiner*—Steven R. Garland
*Attorney, Agent, or Firm*—Baker, Maxham & Jester

[57] ABSTRACT

A portable message device comprises a box-like housing, including a channel hook mounting bracket, for detachable mounting on the edge a closure of an automobile, or a building, and includes a cassette tape player mounted within the housing for playing a prerecorded message. In one embodiment, the tape player is mounted on one end of the bracket and the speaker for the player, and an activating switch is mounted on the other so that the player can be secured within an enclosure with the speaker and activating switch being externally accessible. The player is activated by a push button on the exterior of the speaker housing and includes control means that automatically stops the tape at the end of the message.

6 Claims, 9 Drawing Figures

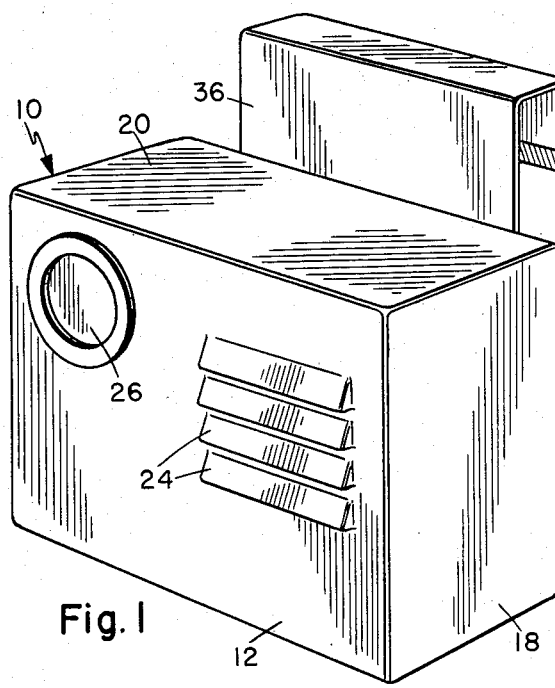
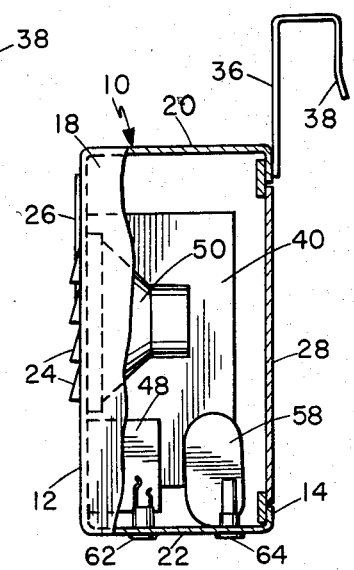
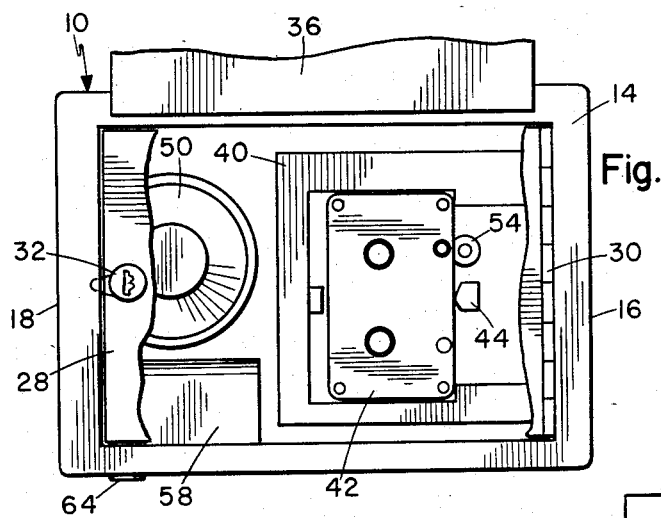
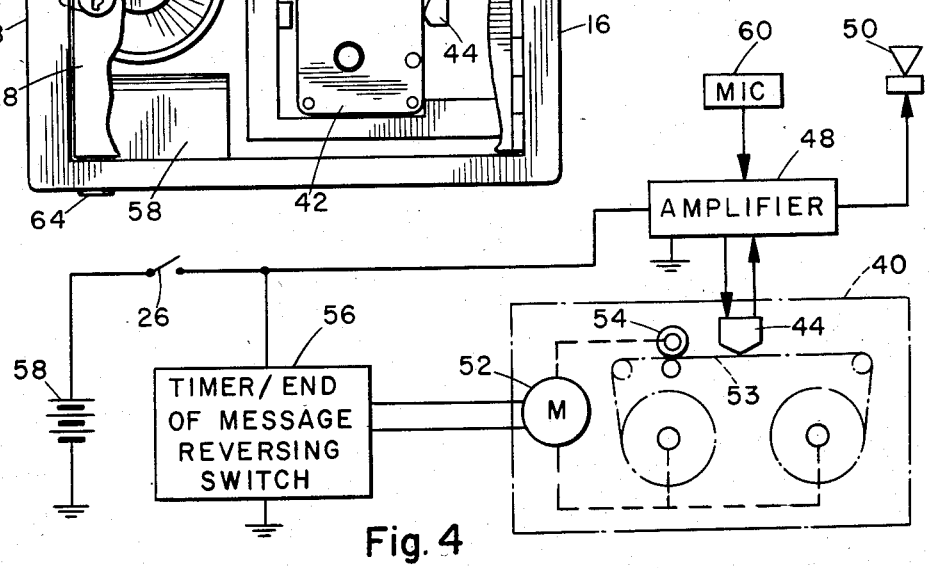

PORTABLE MESSAGE DEVICE WITH A HOOK SHAPED ATTACHING MEANS

Reference to Related Application

This is a Continuation-In-Part of my co-pending application Ser. No. 493,030, filed May 9, 1983, now abandoned, entitled "Device For Presenting Recorded Sales Message".

BACKGROUND OF THE INVENTION

The present invention relates to a portable message device, and pertains particularly a recording and playback device for detachable attachment to the closure of automobiles, buildings and the like.

In businesses like the automobile dealership, it is customary to maintain a fairly large staff of salesmen to answer questions and service customers who come in to look at the vehicles. This is also true of the used vehicle sales lot. The customer normally wants many questions answered relative to the vehicle, such as price, option, possibilities, delivery time, prior ownership, etc. A salesman may know some of the answers, but chances are he or she will not know the answers to several of the questions the prospect will ask.

In addition, the number of prospects visiting such a place varies greatly from time to time. If a large number of salesmen are employed to handle the peak times, they then might be idle a significant part of the remainder of the time. On the other hand, if a minimum number of salesmen are retained, then prospects become unhappy because they have to wait for service and might possibly go to another dealer.

A certain amount of information is provided on the vehicle sticker, but it is never enough to satisfy the various questions which a prospective customer will ask. In addition, it can be difficult to read and understand. The people who provide the information on the sticker are not normally salespersons, and a minimum of information is provided without giving thought to possible other questions that a prospective customer may ask.

A similar problem exists as to the sale of unoccupied dwellings. Other situations present somewhat similar requirements for information. Small merchants may need to close unexpectedly for short periods of time and need to provide information at to their return or other matters to customers.

A solution to this problem requires the well thought-out transfer of adequate information to a prospective customer or customers at the point of sale. This information must be readily available without making the prospective customer or customers wait in turn to obtain the information.

The difficulties that exist with respect to the problem are solved by an exemplary embodiment of the present invention, which is a portable message device that can be detachably attached to a building, or to an object being sold. The device includes a prerecorded message that can be carefully thought-out in advance and that can be rapidly called out without requiring the presence of a salesman, or other person.

SUMMARY AND OBJECTS OF THE INVENTION

It is the primary object of the present invention to provide an improved portable message device.

In accordance with the primary aspect of the present invention, a portable message device includes a security housing, enclosing a tape playing unit for playing a prerecorded message through a loud speaker, and includes means for detachably securing the housing to a building, or an article of sale.

BRIEF DESCRIPTION OF THE DRAWINGS

The above and other objects and advantages of the present invention will become apparent from the following description when read in conjunction with the drawings wherein:

FIG. 1 is a perspective view of a preferred embodiment of the invention;

FIG. 2 is a side elevation view with portions broken away to show details of the embodiment of FIG. 1;

FIG. 3 is a rear elevational view of the embodiment of FIG. 1 with portions broken away to reveal details;

FIG. 4 is a schematic diagram of the system of the unit of FIG. 1;

DETAILED DESCRIPTION OF A PREFERRED EMBODIMENT

Figure 5:
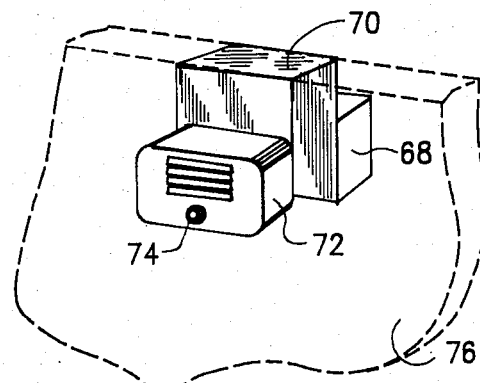
FIG. 5 is a perspective view of an alternate embodiment of the invention.

In the illustrative embodiment, the unit comprises a generally rectangular box-like housing designated generally by the numeral 10, having a generally rectangular front panel 12, a similarly shaped rear panel 14 spaced from and connected to the front panel by means of a pair of side panels 16 and 18, a top panel 20 and a button panel 22. The front panel includes speaker opening 24 and an activating control element, such as a push button switch 26.

Turning to FIGS. 2 and 3, the rear panel 14 includes a hatch door 28 hinged at 30 to the back panel and includes a lock 32 for providing limited or controlled access to the interior of the housing. This arrangement provides a certain amount of security to prevent tampering with the unit.

A mounting bracket 36, in the illustrated embodiment, has a generally channel hook configuration with one leg of the channel attached along the top edge of the back panel 14, and the other leg 38 having a slight outward curvature at the outer edge, and being adapted to hook or extend over and behind a mounting structure, such as the upper edge of a window of an automobile or any other similar mounting or supporting structure, such as a door or the like. This enables the unit to be securely mounted, such as on the window of an automobile, with the automobile locked to secure the device in place, and still provide access to the unit and its message by the consumer. It may also be attached to the door of a building or the like, so that it is securely locked in place when the door is locked.

The mounting device of the unit can take any suitable form for mounting on the door, window or other closures of automobiles, houses to be sold or any other item or structure for sale or about which a consumer may wish information. The device may be mounted on new automobiles in showrooms or on used automobiles on lots and the like. The device can also be used for mounting on implements and machinery, such as farm implements and machinery, construction implements and machinery, and other similar devices. The unit may be utilized for supplying any number of different types of information, as may be desired by purchaser. It can also be utilized for supplying information to truck drivers, route delivery men, and many other applications.

The device, in its simplest form, includes a tape playing unit 40, which may or may not have recording capabilities, as desired. The illustrated embodiment, however, is provided with recording capabilities so that a message may be recorded with the unit, with the use of a proper microphone unit. Schematically illustrated, the device includes a pickup head 44 connected with an amplifier 48, which transmits the signal or message by way of speaker 50.

A reversible tape drive motor 52 is connected in the usual manner to drive the tape 53 in a cassette 42 by a drive wheel 54. An automatic reversing system is provided, which includes a timer or and/or end of message reversing sensor switch 56, connected into the power supply circuit of the system for controlling motor 52 for reversing the motor and rewinding the tape upon reaching the end of the message, or upon a predetermined time interval after the switch 26 has been activated. Such reversing switches are state of the art, and no specific details are believed necessary. Alternatively, the device may utilize a continuous loop tape. A suitable rechargeable battery 58 is provided for powering the circuit and motor of the tape unit.

A microphone 60 may be utilized by plugging into an adaptor 62, as shown in FIG. 2, for recording message with the unit. Alternatively, a microphone may be built into the unit for recording messages.

The unit may be provided, as explained, with a rechargeable battery 58, which may be connected by an externally accessible plug 64, as shown in FIGS. 2 and 3, to enable recharging of the battery.

Figure 6:
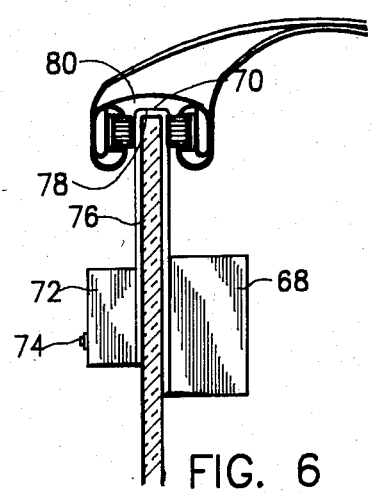
FIG. 6 is a side elevation view of the embodiment of FIG. 5.
Figure 7:
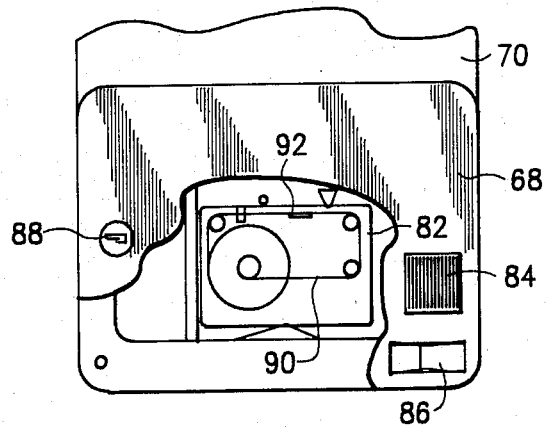
FIG. 7 is a rear elevational view of the embodiment of FIG. 5 with portions broken away to reveal details.

Referring to FIGS. 5-8 of the drawings, an alternate embodiment is illustrated, which is designed to cooperate with a closure, such as a door or window, for providing security for the message unit, while at the same time presenting the speaker and selective control means to an outside position. In this embodiment, a first housing 58 is of a generally box-like rectangular configuration and designed to incorporate the tape recording and drive circuitry, motor and basic apparatus. This housing is connected by a hook-like strap or support member 70 to a second housing 72, which houses a speaker and initiating control button 74 for activating the system. This embodiment, as can be seen in FIG. 6, is designed to hang over a window glass 76 of an automobile, such that the recorder and playing device 68 is positioned on the interior of an automobile to the right, as viewed in FIG. 6, and the speaker 72 and control button 74 are positioned exterior of the automobile, to the left, as viewed therein.

The device can be simply hooked or hung over the window 76, with the window then rolled up to extend within the channel 78, at the upper edge of the window frame 80. Thus, when the door is closed and locked with the window 76 in the rolled up position, the device is securely locked to the window or closure of the automobile. With this arrangement, the device can be placed on automobiles in any location, whether exterior or interior of a building, such that a person may receive a message without the necessity of entering the automobile. Moreover, the device 68 is securely within the automobile to prevent vandalism, tampering or the like. With this arrangement, the components of the recording and playing device within the housing 68 are also securely inside the automobile to protect them against weather, such as rain, excess heat from the sun, and the like. The speaker may be connected to the circuit within the housing by means of any suitable thin insulated conductor or conductors extending along the attachment bracket 70.

In this embodiment, the playing and recording device is preferably designed to use a continuous loop cartridge schematically illustrated at 82 for fitting within the housing. Similarly, the housing is provided with a built-in microphone 84 and a suitable record or play switch or selector 86, such that a message may be recorded, and the switch 86 set to a play position such that activation of the control button 74 results in the message being played. In the illustrated embodiment, the housing may also be provided with a secure cover that may be locked, such as by a conventional lock and key 88, to secure the tape against tampering.

The tape cartridge is preferably a continuous loop tape with a tape 90 having a tripping means or device 92 thereon to trail the message part of the tape, such as to be sensed by a sensing element of the player for sensing the end of the message and cutting off the machine. With the continuous loop arrangement, the need for reversing motors and drives is eliminated. This greatly simplifies the construction and operation of the device.

Figure 8:
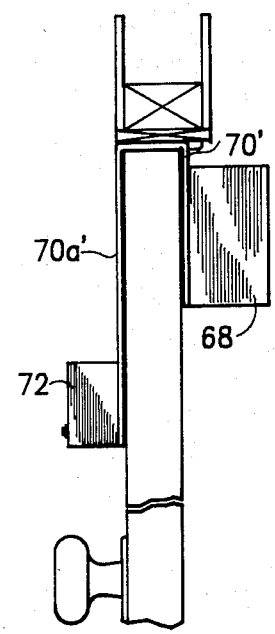
FIG. 8 is a side elevation view like FIG. 6 of a modification of the embodiment of FIG. 5; and, FIG. 9 is a schematic diagram of the operating system of the unit of FIG. 5.

Referring to FIG. 8, a modification of the device suitable for use on the doors or closures of dwellings and the like is illustrated. In this embodiment, the housing 68 is connected by a hook or strap 70' to the second housing 72. The strap 70' has a long leg 70' that positions the speaker and control button 74 downward on the face of a door, so as to be reachable by the average person. This arrangement permits the device to be mounted on doors of buildings, such as dwellings, office buildings and commercial buildings for the purposes of providing readily available messages for callers and the like. This provides that the tape recorder and player are securely positioned interior of the building with the speaker and control button on the exterior of the building accessible for visitors and the like.

Figure 9:
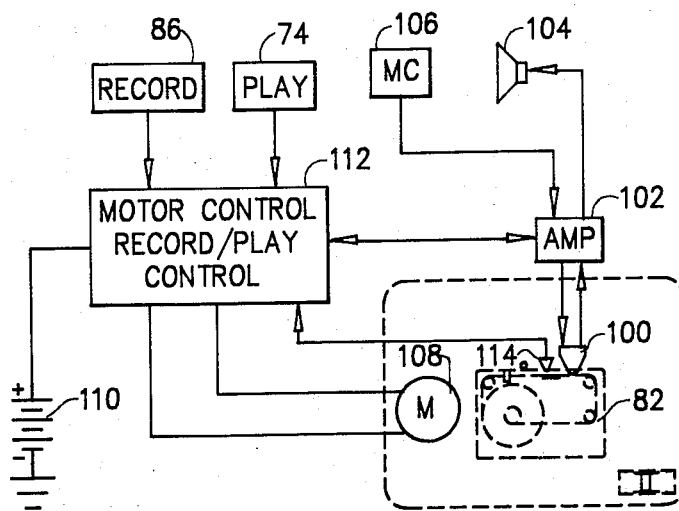

Referring to FIG. 9, a schematic illustration of the recorder and player, similar to that in FIG. 4, is illustrated. In this embodiment in its simplest form, includes a read record head 100 connected with an amplifier 102, which is connected with a speaker 104 and a microphone 106. A tape cartridge 82 is fit within the machine and driven by a motor 108, which is powered by means of a suitable source of power, such as a battery 110, which is connected to the motor through a circuit, including a switch 74 which acts through a control system 112 for recording and/or playing the tape. A sensing head 114 senses the stop strip 92 on the tape and acts through the motor and record play control system for stopping the unit. The continuous loop tape eliminates the necessity for reversing switches and motors and provides a simple effective and inexpensive unit.

Thus, the device can be programmed by recording any suitable message and positioned or displayed to play the message on demand. The construction of the device is such as to cooperate with the closure of an enclosed space, such as the interior of an auto or a building, to securely lock the device a convenient in place. The device may use a continuous loop tape or reversible cassette and be programmed accordingly.

While I have described my invention by means of specific embodiments, it is to be understood that numerous changes and modifications may be made therein without departing from the spirit and scope of the invention as defined in the appended claims.

I claim:

1. A portable message device, comprising:
   housing means for containing electronic playback means;
   mounting means comprising a channel with two ends for hooking around and engaging the edge of a closure for detachable securement between a closure and its surrounding frame;
   said electronic playback means in said housing means for selective playing of a prerecorded message upon demand;
   activating means supported by said mounting means for initiating said demand;
   said housing means comprises first housing means on one end of said channel hook for containing said electronic playback means; and
   second housing means on the other end of said channel hook for containing a speaker and said activating means so that said electronic playback means may be positioned within an enclosed space behind a closure, and thereby positioning said speaker and said activating means in an accessible position.

2. A message device according to claim 1 wherein:
   said channel hook is sized and shaped to fit over the edge of a window glass of an auto for thereby positioning said electronic playback means on the interior of an auto and placing said speaker and said activating means exterior of said auto.

3. A message device according to claim 1 wherein:
   said channel hook is sized and shaped to fit over the edge of a door so that said electronic playback means is positioned on the interior of a building and said speaker and said activating means is positioned on the exterior of said building.

4. A portable message device, comprising:
   a box-like housing;
   a two-ended hook shaped attaching means on said housing for extending around an edge of a closure for an enclosed space for attaching the housing to an object at the point of intended delivery of the message;
   power supply means in said housing;
   message pick-up means in said housing for picking up a prerecorded audible sales message from a magnetic tape and connected to said power supply means;
   speaker means mounted on the opposite end of said attaching means for being positioned on the opposite side of said closure from said housing and electrically connected to said message pick-up means for audibly presenting the prerecorded message;
   actuating means including a pushbutton switch mounted on said speaker means and electrically connected to said power supply means and said message pick-up means for actuating said message pick-up means to pick up the prerecorded message; and
   shutoff means for positioning the tape for replaying the prerecorded message from its beginning after it has been played so that a person can obtain the message by actuating the actuating means.

5. A portable message device according to claim 4 wherein the attaching means includes a substantially U-shaped hook portion for placing over the top of a vehicle window for thereby placing the housing on the interior of a vehicle and the speaker externally of said vehicle.

6. A portable message device according to claim 5 wherein said magnetic tape is a continuous loop cassette.

* * * * *